(12) United States Patent
Adel et al.

(10) Patent No.: US 11,812,266 B2
(45) Date of Patent: Nov. 7, 2023

(54) SYSTEMS AND METHODS FOR NETWORK-BASED AUTHENTICATION FOR CONNECTED VEHICLE ACCESS

(71) Applicant: Verizon Patent and Licensing Inc., Basking Ridge, NJ (US)

(72) Inventors: Michael A Adel, Parsippany, NJ (US); Muhammad Salman Nomani, Somerset, NJ (US); Umesh Kumar Gupta, Morris Plains, NJ (US); Mun Wei Low, Irving, TX (US); Jyotsna Kachroo, Millburn, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 338 days.

(21) Appl. No.: 17/304,517

(22) Filed: Jun. 22, 2021

(65) Prior Publication Data
US 2022/0408259 A1     Dec. 22, 2022

(51) Int. Cl.
| | |
|---|---|
| *H04W 4/00* | (2018.01) |
| *H04W 12/08* | (2021.01) |
| *H04W 12/069* | (2021.01) |
| *H04L 67/306* | (2022.01) |
| *H04W 12/72* | (2021.01) |
| *H04W 4/80* | (2018.01) |
| *H04W 12/03* | (2021.01) |

(52) U.S. Cl.
CPC ........... *H04W 12/08* (2013.01); *H04L 67/306* (2013.01); *H04W 4/80* (2018.02); *H04W 12/03* (2021.01); *H04W 12/069* (2021.01); *H04W 12/72* (2021.01)

(58) Field of Classification Search
CPC ... H04W 12/08; H04W 12/069; H04W 12/72; H04W 4/80; H04W 12/03; H04L 67/306
USPC ......................................................... 370/329
See application file for complete search history.

(56) References Cited

U.S. PATENT DOCUMENTS

| | | | | |
|---|---|---|---|---|
| 9,843,922 B1 * | 12/2017 | Chastain | ............... | H04W 12/06 |
| 9,847,875 B1 * | 12/2017 | Berzin | .................. | H04L 9/0847 |
| 10,664,627 B2 * | 5/2020 | Raju | ....................... | G06F 21/88 |
| 10,750,350 B1 * | 8/2020 | Gundavelli | ......... | H04W 12/043 |
| 11,627,137 B2 * | 4/2023 | Chauhan | ............... | H04L 63/108 |
| | | | | 726/4 |

(Continued)

*Primary Examiner* — Marceau Milord (57) ABSTRACT

In some implementations, an authentication system may receive a user authentication request identifying a primary device. The authentication system may generate a challenge associated with a user profile mapped to the primary device. The authentication system may transmit a challenge message including the challenge. The authentication system may receive a challenge response including a response to the challenge, wherein the response to the challenge includes identification information regarding the user profile. The authentication system may determine a set of primary services associated with the user profile mapped to the primary device and a set of secondary services associated with a set of secondary devices. The authentication system may generate a set of security keys mapped to the set of primary services and the set of secondary services. The authentication system may provision the primary device and the set of secondary devices with the set of security keys.

20 Claims, 8 Drawing Sheets

(56) References Cited

U.S. PATENT DOCUMENTS

| | | | |
|---|---|---|---|
| 2016/0379220 A1* | 12/2016 | Tunnell | H04W 12/068 |
| | | | 705/71 |
| 2017/0289333 A1* | 10/2017 | Pai | H04W 8/18 |
| 2018/0077666 A1* | 3/2018 | Chastain | H04W 12/041 |
| 2018/0121685 A1* | 5/2018 | Goldberg | G06F 21/88 |
| 2018/0160292 A1* | 6/2018 | Chastain | H04W 4/50 |
| 2019/0372834 A1* | 12/2019 | Patil | H04L 9/3263 |
| 2019/0394322 A1* | 12/2019 | Pai | H04L 63/08 |
| 2020/0007676 A1* | 1/2020 | Pai | H04L 63/08 |
| 2020/0100108 A1* | 3/2020 | Everson | H04L 9/3247 |
| 2020/0274854 A1* | 8/2020 | Mueller | H04L 9/0872 |
| 2020/0327260 A1* | 10/2020 | Raju | H04L 61/103 |
| 2020/0359213 A1* | 11/2020 | Huang | H04W 12/06 |
| 2021/0041855 A1* | 2/2021 | Kursun | G06N 20/00 |
| 2021/0092605 A1* | 3/2021 | Draznin | H04L 63/0281 |

* cited by examiner

SYSTEMS AND METHODS FOR NETWORK-BASED AUTHENTICATION FOR CONNECTED VEHICLE ACCESS

BACKGROUND

A connected vehicle may include a car, a motorcycle, a bicycle, a boat, a drone, or an aircraft, among other examples, that can communicate with systems external to the vehicle. For example, some cars may have cellular connectivity to a cellular network. Other types of connected devices may include home security systems, appliances (e.g., a smart refrigerator or a smart washer/dryer), or other Internet of Things (IoT) devices. On a downlink, a connected device may receive traffic data, weather data, or software updates using a connection to a server via the cellular network (e.g., and via the Internet). On an uplink, a connected device may provide observations of a traffic condition, data captured by a set of autonomous vehicle cameras, or status information regarding the connected device, among other examples. Other types of connections may be possible, such as Bluetooth connections or Wi-Fi connections that may enable connectivity for a vehicle to systems external to the connected device.

DETAILED DESCRIPTION OF PREFERRED EMBODIMENTS

The following detailed description of example implementations refers to the accompanying drawings. The same reference numbers in different drawings may identify the same or similar elements.

Some connected devices, such as vehicles may have a set of services available to a user of the connected device. For example, a vehicle may have a remote-start or remote-access capabilities. In this example, a vehicle key (e.g., a remote keyless system (RKS) or keyfob, which includes a transmitter and which may be associated with a physical key) may be paired with a security system and an ignition system of a vehicle (e.g., a car), and a user may use the vehicle key (e.g., the RKS) to remotely unlock the car (e.g., by pressing a button on the RKS) and/or remotely start an engine of the vehicle (e.g., by pressing a button on the RKS). Such a pairing may be configured by a manufacturer and may remain static while the key and the car remain operable. In other words, an owner of a car may use the same RKS for the entire time that the owner owns the car. Moreover, manufacturers of vehicles may also provide keys at the time of vehicle purchase. As another example of a service, some vehicles may have access to satellite radio subscriptions. As further examples of services, some vehicles may have cellular or Wi-Fi connections (e.g., to a data network), through which a user may access a music-streaming service, a weather service, the internet, or a traffic data service, among other examples.

However, with a proliferation of connected devices, such as smartphones and smart wearable devices (e.g., smart watches), it may be desirable to use a connected device for remote-start or remote-access capabilities with a vehicle rather than a key. Such connected devices may be replaced more frequently than the vehicle and may be purchased separately from a vehicle, so a static pairing of a connected device to a vehicle may result in a loss of functionality if a user replaces a connected device at a different time than a vehicle. Moreover, originally equipment manufacturers (OEMs) for vehicles (e.g., automakers) may restrict a set of services that are available on a particular vehicle or may require vehicle-specific subscriptions to various services. For example, a first OEM of a first vehicle may require a first subscription for a streaming-audio service on the first vehicle, and a second OEM of a second vehicle may require a second subscription for a streaming-audio service on the second vehicle. This may result in multiple copies of the same streaming audio service being installed on multiple vehicles in connection with multiple subscriptions. Moreover, when access to such services (e.g., remote vehicle access, subscription modification, etc.) is performed via OEM-specific applications, a user may need to install and operate multiple OEM-specific applications on a user device of the user, thereby wasting memory resources and processor resources to install and operate the multiple OEM-specific applications.

Some implementations described herein enable dynamic provisioning of connected devices for use with a vehicle. For example, an authentication server may communicate with a user device to authenticate access to a connected capability (e.g., a set of services) of a vehicle. The authentication server may generate a set of security keys and may provision a secure element of the user device with the set of security keys to a set of connected devices associated with a user of the user device (e.g., the user's smartphone, the user's smart watch, etc.), thereby enabling each connected device associated with the user to access connected capabilities (e.g., locking/unlocking, ignition remote-start, etc.). In some implementations, the authentication server may enable biometric authentication as a part of an authentication process for provisioning a connected device. In this way, the authentication server may enable a user to use a single application to operate multiple different services associated with multiple different vehicles, thereby reducing a memory and processor utilization relative to the multiple services of the multiple vehicles being siloed into separate OEM-specific applications.

Moreover, the authentication server may provide security keys associated with the user device to the vehicle, thereby enabling the vehicle to access a service of the user device (e.g., a streaming music service, a weather data service, or a traffic data service) without requiring the vehicle to install and operate the vehicle's own service and without requiring the user to maintain multiple subscriptions to use the same service on multiple vehicles. In this way, the authentication server may reduce a quantity of subscriptions to services, thereby reducing data entries, emails, and other associated uses of computing resources associated with maintaining the subscriptions to the services. Furthermore, the authentication server may enable access to services for which an OEM has not provided native support within a computing system of a vehicle. Although some implementations are described herein in terms of a primary device that is a user device (e.g., a smart phone) and a secondary device that is a vehicle, other types of devices may be possible, such as primary devices that are wearable devices or secondary devices that are other types of connected devices (e.g., smart security systems, smart appliances, or other Internet of Things (IoT) devices), among other examples.

FIGS. 1A-1D are diagrams of an example 100 associated with network-based authentication for connected vehicle access. As shown in FIGS. 1A-1D, example 100 includes a primary device 102, a secondary device 104, and an authentication system 106. Primary device 102 and secondary device 104 may be, respectively, a user device (e.g., a smart phone) and a vehicle device (e.g., a connected device or set of connected devices deployed within a vehicle and having connectivity to a network). Authentication system 106 may be an application server controlling an application on primary device 102 and may be deployed within or in connection with a primary device cloud, which stores a user profile and/or provides services associated with primary device 102. Secondary device 104 may be associated with a secondary device cloud that stores a user profile and/or provides services associated with secondary device 104. In other words, the primary device cloud may refer to a set of remote servers and/or cloud services associated with primary device 102 and primary services provided via primary device 102 and the secondary device cloud may refer to a set of remote servers and/or cloud services associated with secondary device 104 and secondary services provided via secondary device 104.

Figure 1A:
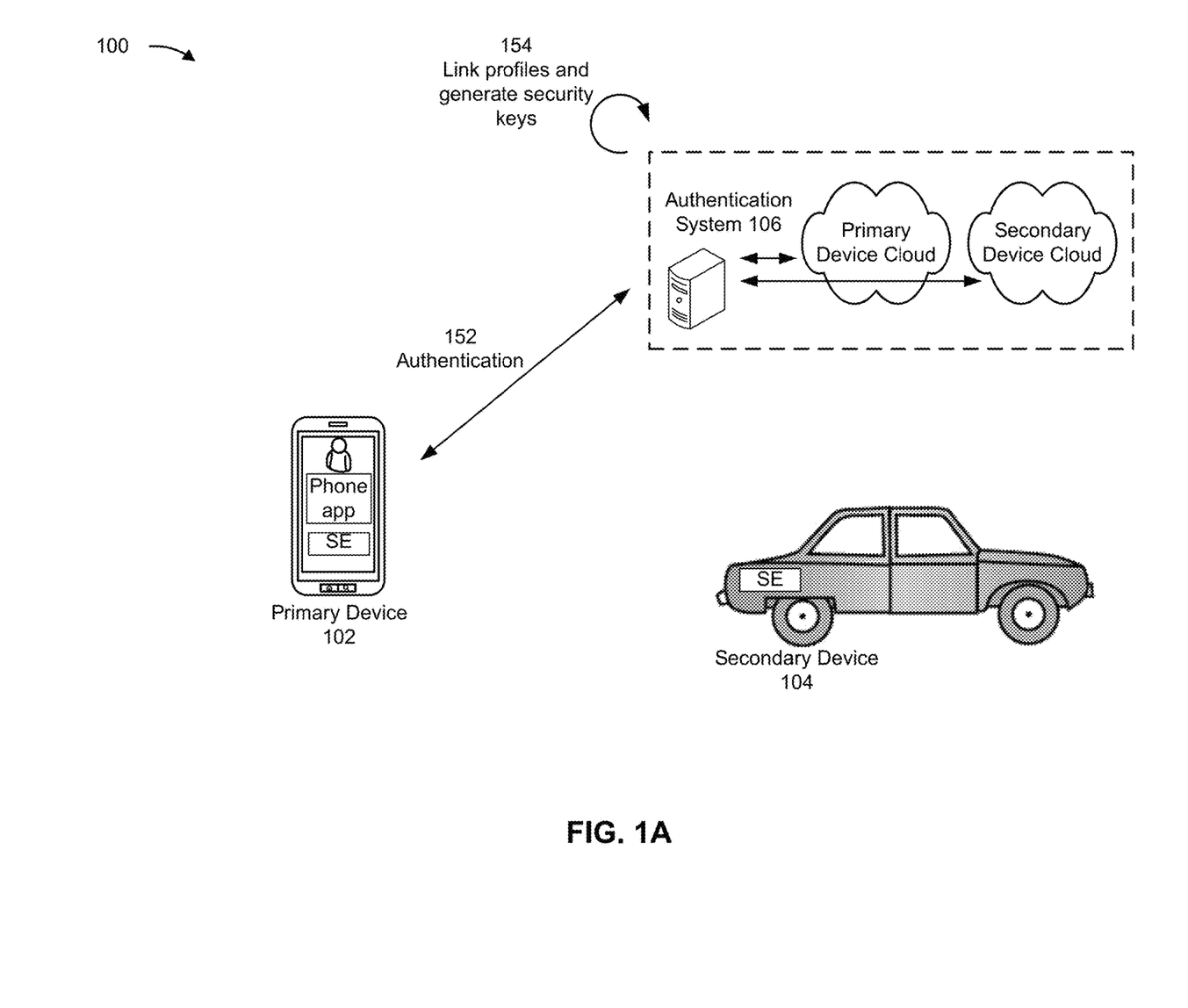
FIGS. 1A-1D are diagrams of an example associated with network-based authentication for connected vehicle access.

As shown in FIG. 1A, and by reference number 152, authentication system 106 may authenticate primary device 102. For example, authentication system 106 may communicate with primary device 102 to confirm authentication information for primary device 102. The authentication information may include a user identifier (e.g., a username), a password, a two-factor authentication confirmation, or a biometric identification, among other examples. In some implementations, authentication system 106 may identify a user in connection with performing the authentication. For example, authentication system 106 may access a first user profile stored in the primary device cloud using information identifying primary device 102, such as using a value associated with a subscriber information module (SIM) or embedded SIM (eSIM), a media access control (MAC) address, an integrated circuit card identifier (ICCID), an international mobile equipment identity (IMEI), an international mobile subscriber identity (IMSI), a mobile device number (MDN), a mobile identification number (MIN), an identification string, a serial number, a username, or a password, among other examples. Based on accessing the first user profile, authentication system 106 may transmit a challenge message requesting that the user provide a challenge message response, such as a password, two-factor authentication response, or a biometric response, among other examples and may determine whether the challenge message response matches information associated with the first user profile to authenticate a user of primary device 102.

In some implementations, authentication system 106 may receive a request, in connection with authenticating the user of primary device 102, to link the first user profile (for a particular user) with a second user profile (for the same particular user). In other words, authentication system 106 may link different profiles that the same user has with different services, such as a first profile that the user has with a server associated with a cell phone provider and a second profile that the user has with a server associated with an automobile manufacturer. For example, primary device 102 may receive information identifying secondary device 104 and provide the information identifying secondary device 104 to authentication system 106 to enable authentication system 106 to link the first user profile (associated with primary device 102) with a second user profile (associated with secondary device 104). In this case, primary device 102 may obtain the information identifying secondary device 104 via user input to a user interface (e.g., of a vehicle identification number (VIN number)), a photograph (e.g., of a VIN number displayed on secondary device 104), a communication with secondary device 104 (e.g., Bluetooth or Near-field communication (NFC) with secondary device 104 to obtain a VIN associated with secondary device 104), among other examples. Other examples of identifiers of secondary device 104 and/or a vehicle associated therewith may include a device identifier, a MAC address, an Internet protocol (IP) address, a username, or a password, among other examples.

In some implementations, the second user profile may be specific to a vehicle rather than to a user of primary device 102. For example, a rental car company or a fleet management company may maintain company profiles for a fleet of vehicles and may allow a user of a vehicle (e.g., a renter or an employee) to link a personal profile with a company profile to gain access to a specific vehicle that is being rented or assigned for work duties. In this case, the company profile for the vehicle may be linked to a user profile of a user as well as to a user profile of a manager of the company, which may enable the manager of the company to also access some services of the vehicle, such as driving data (e.g., for monitoring an employee) or engine data (e.g., for locking out a stolen vehicle or providing roadside assistance), among other examples.

As shown in FIG. 1A, and by reference number 154, authentication system 106 may link a set of profiles and generate a set of security keys. For example, authentication system 106 may access the primary device cloud or the secondary device cloud to link the set of profiles and generate the set of security keys. In some implementations, authentication system 106 may store information identifying linkages between profiles of the primary device cloud and corresponding profiles of the secondary device cloud. Alternatively, authentication system 106 may provide information to the primary device cloud and/or the secondary device cloud to identify a linkage between a first profile in the primary device cloud and a corresponding second profile in the secondary device cloud. For example, authentication system 106 may set a field in a data structure of the secondary device cloud to indicate that a first profile in the primary device cloud is associated to a second profile in the secondary device cloud.

In some implementations, authentication system 106 may generate a security key for storage in a secure element (SE) of primary device 102 and/or secondary device 104. A secure element may be a hardware component (e.g., a microprocessor chip) that can store sensitive data and/or run sensitive applications while protecting data stored therein from malware attacks on a host (e.g., a device that includes the secure element). The secure element may have functions relating to authentication and digital signature generation. In some implementations, the secure element may include a secure boot function, protected debugging ports, memory protection units (MPUs), public key cryptography (e.g., Rivest-Shamir-Adleman (RSA) encryption, elliptic-curve cryptography, or Diffie-Helman key exchange-based cryptography, among other examples), symmetric key cryptography (e.g., advanced encryption standard (AES) cryptography among other examples), or a cryptographic accelerator, among other examples.

The authentication system 106 may communicate with a secure element of primary device 102 when authenticating the user of primary device 102 (e.g., the secure element may provide some verification information to authentication system 106, such as a token, to verify an identity of primary device 102 and/or a user thereof). In this case, authentication system 106 may generate a cryptographic key (e.g., a security key) for storage in, for example, the secure element of primary device 102. The secure element of primary device 102 may be linked to the first user profile that the user has with the primary device server (and the first user profile may be linked to a second user profile with the secondary device server). And, authentication system 106 may communicate with the primary device server or secondary device server to generate a security key, a set of security keys (e.g., a private security key and a public security key), a token, or another secure identifier that primary device 102 may use for authentication with secondary device 104. Similarly, authentication system 106 may generate a security key, a set of security keys, a token, or another secure identifier that secondary device 104 may use for authentication with primary device 102.

Figure 1B:
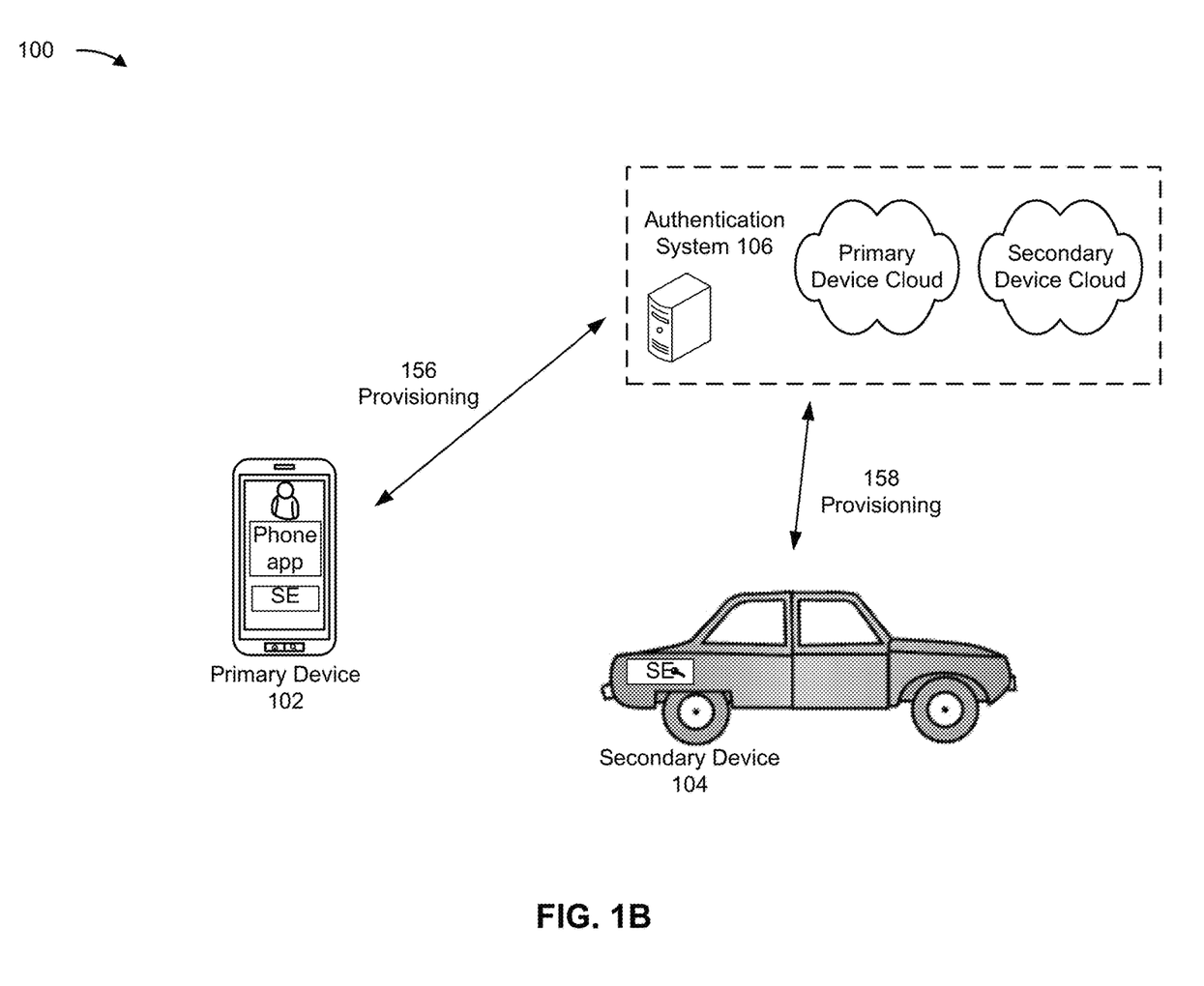

As shown in FIG. 1B, and by reference numbers 156 and 158, authentication system 106 may provision primary device 102 and secondary device 104. For example, authentication system 106 may communicate with primary device 102 to provide secure information to enable primary device 102 to access and/or control secondary services (e.g., services associated with secondary device 104). Authentication system 106 may provision a secure element or eSIM of primary device 102 or secondary device 104 by providing a generated security key, token, or other identifier.

Authentication system 106 may indicate which secondary services, such as remote ignition, remote parking, infotainment management, or climate control, among other examples, to which the secure information provides control. The secure information may include a security key, a set of security keys, or a token, among other examples. Similarly, authentication system 106 may communicate with secondary device 104 to provide secure information to enable secondary device 104 to access and/or control primary services (e.g., services associated with primary device 102). Authentication system 106 may indicate which services, such as entertainment services, payment services, messaging services, remote support services, data access services, or tethering services, among other examples, that secondary device 104 may access or control. In this case, authentication system 106 may authenticate a user of primary device 102 and/or authentication system 106 with secondary device 104 to access the secure element of secondary device 104.

In some implementations, authentication system 106 may provide secure information to a secure element. For example, authentication system 106 may provide a security key for storage in a secure element of primary device 102 or secondary device 104. In some implementations, authentication system 106 may provide secure information via push messaging. For example, authentication system 106 may transmit a push notification identifying a new security key (e.g., when a linkage is registered and/or bound between profiles in the primary device cloud and secondary device cloud). In this case, when, for example, the secondary device cloud is updated with information regarding another vehicle and associated secondary device pertaining to the same profile as secondary device 104, authentication system 106 may detect the update based on the linkage between the first profile in the primary device cloud and the second profile in the secondary device cloud and may push a new security key to primary device 102 without the user requesting the new security key.

Figure 1C:
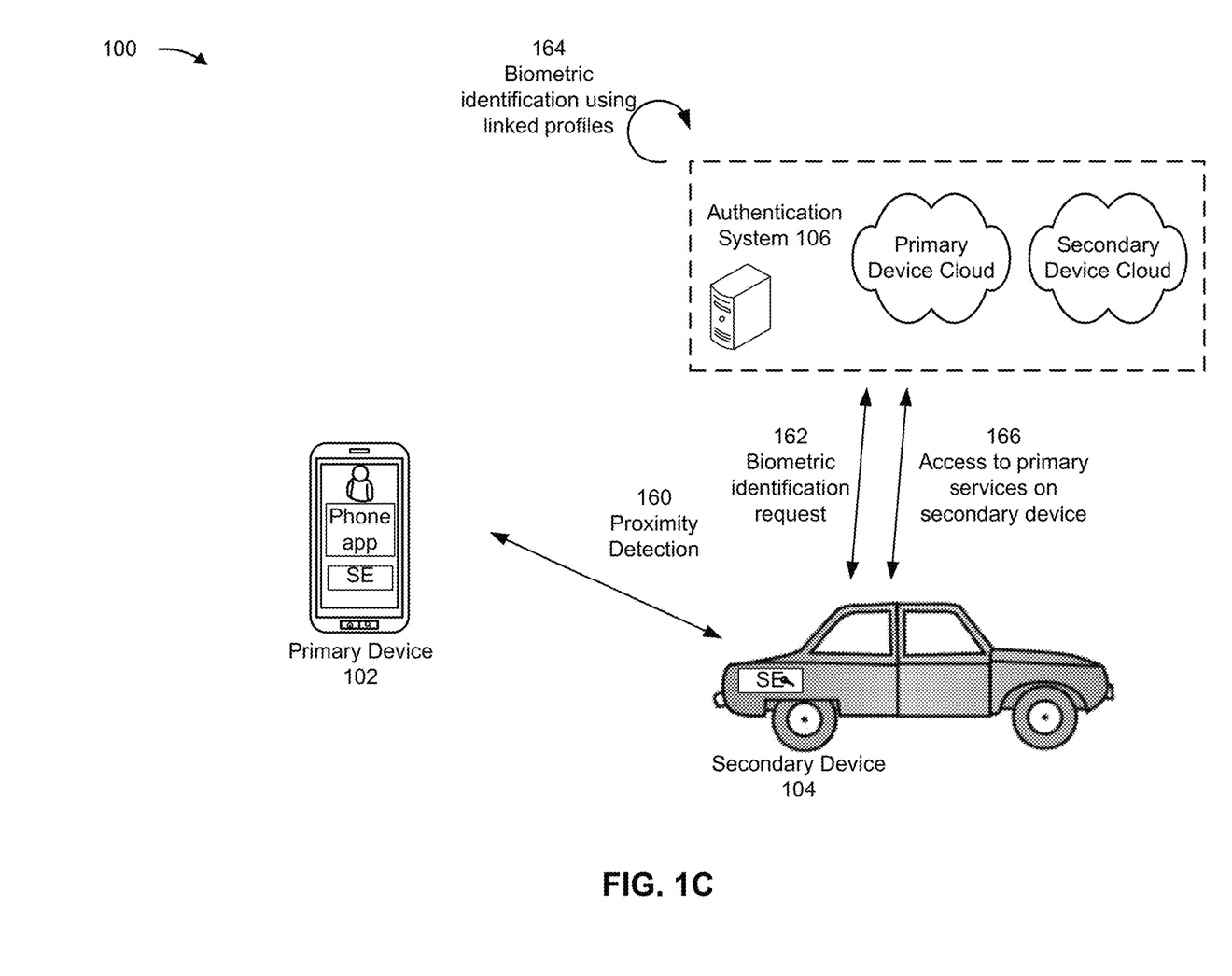

As shown in FIG. 1C, and by reference numbers 160, 162, and 164, when primary device 102 is within a threshold proximity of secondary device 104, authentication system 106 may receive a biometric identification request and may perform biometric identification using the set of linked profiles. For example, secondary device 104 may detect primary device 102 and perform a biometric identification check on a user of primary device 102. Secondary device 104 may detect primary device 102 based at least in part on detecting a Bluetooth beacon, an NFC transmission, or another type of short-range wireless transmission, among other examples.

Additionally, or alternatively, secondary device 104 may detect primary device 102 or a user thereof using another technique, such as based at least in part on detecting a sound (e.g., a voice command or an ambient noise) or detecting an object or person (e.g., by using a camera to detect a presence of primary device 102 or a user of primary device 102). In the case, of detecting an object or person, secondary device 104 may use a computer vision or machine learning algorithm trained to recognize a shape, color, or other feature of primary device 102 and/or to recognize faces or a particular face of a particular user. Similarly, in the case of detecting a sound, secondary device 104 may use a language recognition algorithm or a voice recognition algorithm. In some implementations, a profile (e.g., an image for use in facial recognition or a voice profile for use in audio recognition) for a user of primary device 102 may be included among information synchronized between a first profile for primary device 102 and a second profile for secondary device 104 (e.g., a customized voice profile for use with a virtual artificial intelligence (AI) assistant of primary device 102 may be shared to secondary device 104 to use for voice recognition without having to create a new voice profile for secondary device 104).

Based on detecting primary device 102 and/or a user thereof, secondary device 104 may authenticate primary device 102 and/or the user thereof for use of primary services on secondary device 104. For example, secondary device 104 may perform a fingerprint identification, a facial recognition identification, a voice recognition identification, among other examples. In such cases, secondary device 104 may perform a biometric identification in connection with the secondary device cloud and/or the authentication system 106 (e.g., by providing information to the authentication system 106 for verification and receiving a response). Additionally, or alternatively, secondary device 104 may perform a biometric identification locally (e.g., using local processing of secondary device 104 and profile information shared from the secondary device cloud based on authentication system 106 synchronizing respective profiles of the primary device cloud and the secondary device cloud). In this case, secondary device 104 may provide direct access to primary device 102 without further intervening communication occurring between primary device 102 and authentication system 106 or a third party device. Additionally, or alternatively, secondary device 104 may perform a non-biometric identification (e.g., using a password, a pass code, a pass phrase, or a two-factor authentication system, among other examples).

In some implementations, secondary device 104 may use a stored security key for authentication. For example, a first secure element of primary device 102 may communicate with a second secure element of secondary device 104 (e.g., based on primary device 102 being within a threshold proximity of secondary device 104). In this case, the first secure element may use a first stored security key to communicate with the second secure element, which may use a second stored security key. Based on confirming that the primary device 102 and the user thereof, which are within a threshold proximity of secondary device 104, are authenticated for use of secondary device 104, secondary device 104 may provide, in connection with authentication system 106, the primary device cloud, and the secondary device cloud, access to primary services secondary device 104. For example, secondary device 104 may provide access to a voice AI assistant service, a music streaming service, a navigation service, a traffic data service, or a weather data service, among other examples, as shown by reference number 166.

In some implementations, secondary device 104 may use a stored security key for authentication with a third-party server (not shown). For example, secondary device 104 may use the stored security key to authenticate secondary device 104 with a music streaming service application server to provide access to an account established for primary device 102. In other words, when a user of primary device 102 has access to an account with a music streaming service through primary device 102 (and an account with cell service provider of primary device 102), secondary device 104 may use a security key (e.g., received during the linking of respective profiles) to automatically log into the account with the music streaming service, without the user being required to log in manually via a user interface of secondary device 104. In this way, user interaction with the user interface of secondary device 104 is obviated, thereby reducing utilization of processing resources and/or obviating a need for a user interface, which reduces a utilization of power resources.

Figure 1D:
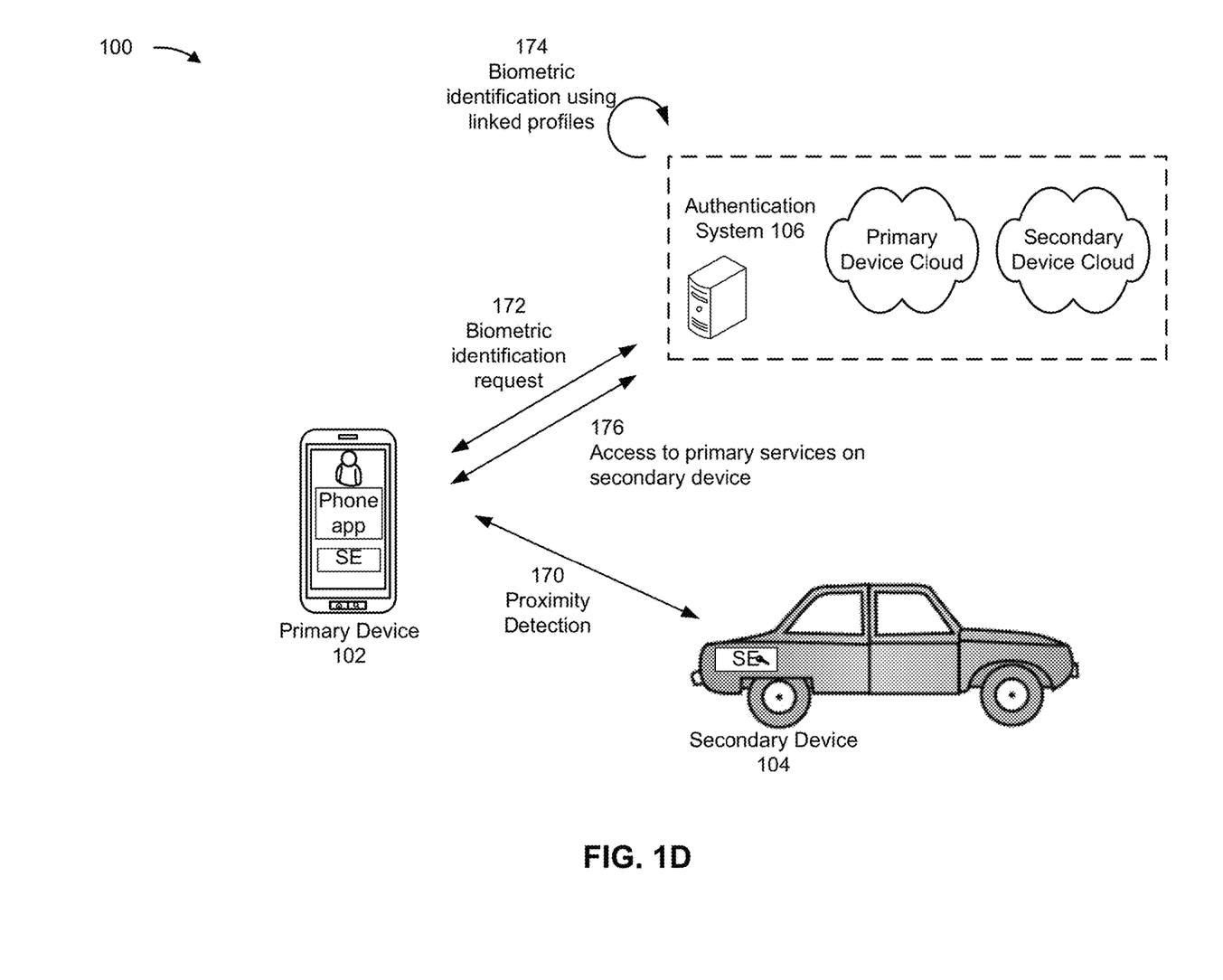

As shown in FIG. 1D, and by reference numbers 170, 172, and 174, when primary device 102 is within a threshold proximity of secondary device 104, authentication system 106 may receive a biometric identification request and may perform biometric identification using the set of linked profiles. For example, primary device 102 may detect secondary device 104 and perform a biometric identification check on a user of primary device 102. Primary device 102 may detect secondary device 104 based at least in part on detecting a short range beacon (e.g., Bluetooth), an NFC transmission, a sound, or an object (e.g., a license plate), among other examples.

Based on detecting secondary device 104, primary device 102 may authenticate primary device 102 and/or the user thereof for use of secondary services on primary device 102. For example, primary device 102 may perform a fingerprint identification, a facial recognition identification, a voice recognition identification, among other examples. In such cases, primary device 102 may perform an identification in connection with the primary device cloud and/or the authentication system 106 (e.g., by providing information to the authentication system 106 for verification and receiving a response). Additionally, or alternatively, primary device 102 may perform an identification locally (e.g., providing direct access to secondary device 104 without communication occurring between secondary device 104 and authentication system 106 or a third party device).

In some implementations, primary device 102 may use a stored security key for authentication. For example, a first secure element of primary device 102 may communicate with a second secure element of secondary device 104 (e.g., based on primary device 102 being within a threshold proximity of secondary device 104), as described herein. In this case, based on authenticating primary device 102 for use of secondary services, primary device 102 may provide the secondary services (e.g., via a user interface of primary device 102 and/or via authentication system 106 providing the user interface for display via primary device 102). For example, primary device 102 may provide a user interface (e.g., a visual user interface, a voice-command based user interface, or a gesture based user interface, among other examples) with which a user may unlock secondary device 104 (e.g., a vehicle that includes secondary device 104) or control secondary device 104 (e.g., control a climate feature, an infotainment system feature, or an engine control system feature of a vehicle that includes secondary device 104), as shown by reference number 176. In this way, authentication system 106, primary device 102, and secondary device 104 enable access to any secondary device services or any type of secondary device and vehicle associated therewith on primary device 102, thereby obviating a need for a user to maintain multiple applications for multiple different vehicles on primary device 102.

Additionally, or alternatively, primary device 102 may obtain information regarding secondary device 104 and/or a vehicle associated therewith. For example, primary device 102 may obtain information relating to a check engine light of a vehicle to enable a user to perform diagnostics on the vehicle. Additionally, or alternatively, primary device 102 may automatically or in connection with communication with authentication system 106 or an application server, automatically perform diagnostics on the vehicle, such as by altering computer-controlled engine parameters to resolve a detected issue. In this way, authentication system 106 may enable primary device 102 to enhance functionality of secondary device 104 (e.g., by using superior processing capabilities or updated software capabilities of primary device 102 to resolve issues that secondary device 104 may be unable to resolve).

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
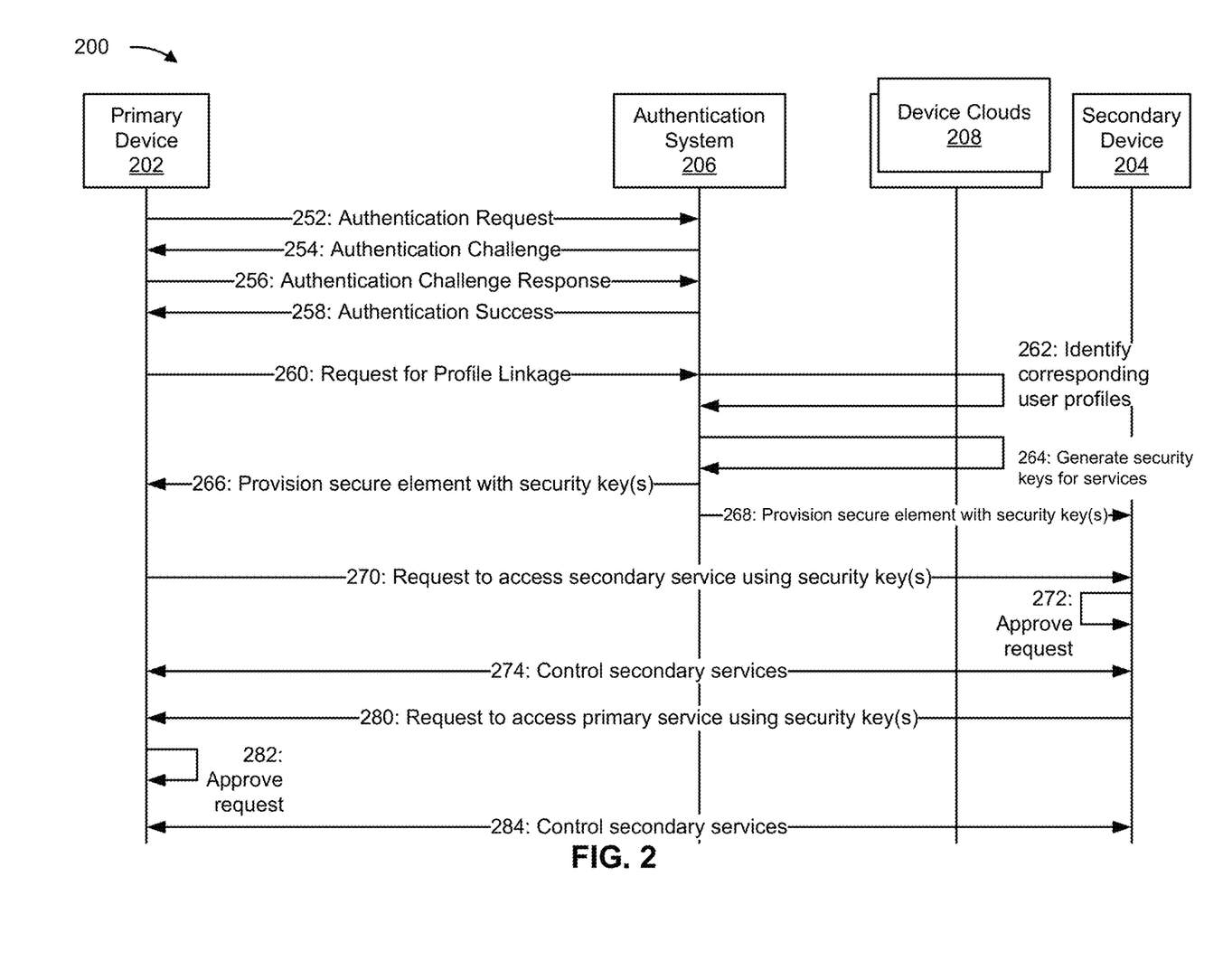
FIG. 2 is a call flow diagram associated with network-based authentication for connected vehicle access.

FIG. 2 is a diagram of an example call flow diagram 200 associated with network-based authentication for connected vehicle access. As shown in FIG. 2, call flow diagram 200 includes a primary device 202, a secondary device 204, an authentication system 206, and a set of device clouds 208. These devices are described in more detail below in connection with FIG. 4 and FIG. 3.

As shown by steps 252-258, primary device 202 and authentication system 206 may communicate to perform an authentication procedure. For example, primary device 202 may transmit an authentication request (step 252), receive an authentication challenge (step 254), transmit an authentication challenge response (step 256), and receive an indication of an authentication success (step 258). In some implementations, authentication system 206 may communicate with a device cloud 208 to determine the authentication challenge and/or whether the authentication challenge response is correct. For example, authentication system 206 may communicate with a device cloud 208 to determine whether a provided username and password are correct.

As shown by steps 260-268, authentication system 206 may communicate with primary device 202, device clouds 208, and/or secondary device 204 to link a set of user profiles, generate a set of security keys, and provision a set of secure elements. For example, based on primary device 202 being authenticated with authentication system 206, primary device 202 may request (step 260) that authentication system 206 link a first profile associated with primary device 202 to a corresponding second profile associated with secondary device 204. In this case, authentication system 206 may receive information identifying the second profile or may determine the second profile (step 262) based on information included in the first profile (e.g., authentication system 206 may correlate a user identifier in the first profile (stored by a first device cloud 208) with the same user identifier in the second profile (stored by a second device cloud 208)).

Based on identifying the second profile, authentication system 206 may communicate with device clouds 208 to generate security keys for services (step 264). For example, authentication system 206 may determine a cryptographic key or token that primary device 202 can use to access a service of secondary device 204 or vice versa. In this case, the cryptographic key or token may enable primary device 202 to access a service of a device cloud 208 or of secondary device 204. In other words, in some cases, primary device 202 may use a cryptographic key or token to access services being provided for secondary device 204 by a device cloud 208 and in other cases, primary device 202 may use a cryptographic key or token to access services being provided for secondary device 204 and by secondary device 204. In some implementations, authentication system 206 may generate the cryptographic keys or may transmit an instruction to device clouds 208 to cause device clouds 208 to generate the cryptographic keys and provide the cryptographic keys to respective secure elements of primary device 202 (step 266) and/or secondary device 204 (step 268) (e.g., via authentication system 206).

As shown by steps 270-274, primary device 202 may request and receive access to secondary services. For example, primary device 202 may use a security key to request access to a secondary service of secondary device 204 (step 270), and secondary device 204 may approve the request (step 272) based at least in part on performing a cryptographic check (e.g., comparing an output of a first secure element of primary device 202 using a first security key with an output of a second secure element of secondary device 204 using a second security key). Based on approving the request, secondary device 204 may grant control of secondary services to primary device 202 (step 274).

As shown by steps 280-284, secondary device 204 may request and receive access to primary services. For example, secondary device 204 may use a security key to request access to a primary service of primary device 202 (step 280), and primary device 202 may approve the request (step 282) based at least in part on performing a cryptographic check (e.g., comparing an output of a second secure element of secondary device 204 using a second security key with an output of a first secure element of primary device 202 using a first security key). Based on approving the request, primary device 202 may grant control of secondary services to secondary device 204 (step 284).

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
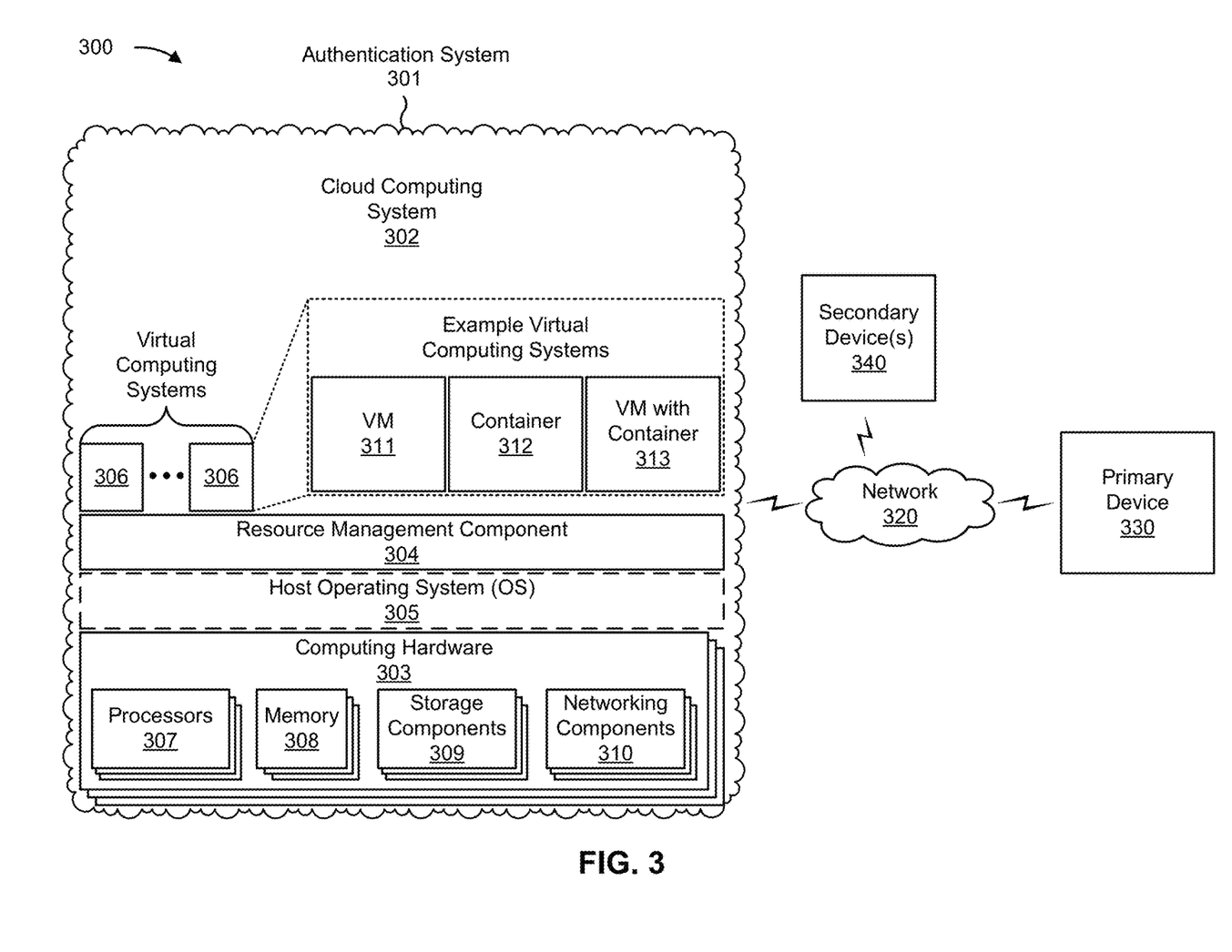
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a authentication system 301, which may include one or more elements of and/or may execute within a cloud computing system 302. The cloud computing system 302 may include one or more elements 303-313, as described in more detail below. As further shown in FIG. 3, environment 300 may include a network 320, a primary device 330, and/or a secondary device 340. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, or a hybrid environment 313 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the authentication system 301 may include one or more elements 303-313 of the cloud computing system 302, may execute within the cloud computing system 302, and/or may be hosted within the cloud computing system 302, in some implementations, the authentication system 301 may not be cloud-based (e.g., may be implemented outside of a cloud computing system) or may be partially cloud-based. For example, the authentication system 301 may include one or more devices that are not part of the cloud computing system 302, such as device 400 of FIG. 4, which may include a standalone server or another type of computing device. The authentication system 301 may perform one or more operations and/or processes described in more detail elsewhere herein. The authentication system 301 may include an identity management function (e.g., the authentication system 301 may provide identity and access management, entitlement management, and user provisioning by performing security key generation and profile linking functionalities). The authentication system 301 may include a telematics control unit function (e.g., the authentication system 301 may be linked with an embedded system associated with secondary device 340) that wireless connects components of a vehicle with a wireless network). The authentication system 301 may include a trusted service manager (TSM) function (e.g., serving as a neutral broker for connections or agreements between network operators, OEMs, or other secure element providers and service providers to enable use of NFC for communication between primary device 330 and secondary device 340).

Network 320 includes one or more wired and/or wireless networks. For example, network 320 may include a cellular network, a public land mobile network (PLMN), a local area network (LAN), a wide area network (WAN), a private network, the Internet, and/or a combination of these or other types of networks. The network 320 enables communication among the devices of environment 300.

The primary device 330 includes one or more devices capable of receiving, generating, storing, processing, and/or providing information associated with communication with secondary device 340, as described elsewhere herein. The primary device 330 may include a communication device and/or a computing device and may include an eSIM and/or a secure element. For example, the primary device 330 may include a wireless communication device, a mobile phone, a user equipment, a laptop computer, a tablet computer, a wearable communication device (e.g., a smart wristwatch, a pair of smart eyeglasses, a head mounted display, or a virtual reality headset), or a similar type of device.

The secondary device 340 includes one or more devices capable of receiving, generating, storing, processing, and/or providing information associated with a vehicle, as described elsewhere herein. The secondary device 340 may include a communication device and/or a computing device and may include an eSIM and/or a secure element. For example, the secondary device 340 may include a telematics device, an in-vehicle device, a hub of a controller area network (CAN network), a wireless communication device, an infotainment system, an engine control unit (ECU), an Internet of Things (IoT) device, a user equipment, a laptop computer, a tablet computer, or a similar type of device. In some implementations, secondary device 340 may be deployed in a vehicle, such as a car, a motorcycle, a boat, a plane, a drone, or another type of vehicle. In some implementations, secondary device 340 may be deployed in another IoT context, such as a connected security system, a connected appliance, or a connected energy system (e.g., smart solar panels or a smart air conditioner), among other examples. In some implementations, a set of secondary devices 340 may be linked to a single primary device 330 (e.g., a single primary device 330 may link to a telematics device, an IoT device, and a user equipment deployed in the same vehicle or in a set of vehicles). Similarly, a set of primary devices 330 may link to a single secondary device 340 (e.g., multiple users' smart phones connected to a single vehicle or a single user's multiple devices, such as a smart phone and a smart watch, connected to a single vehicle).

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
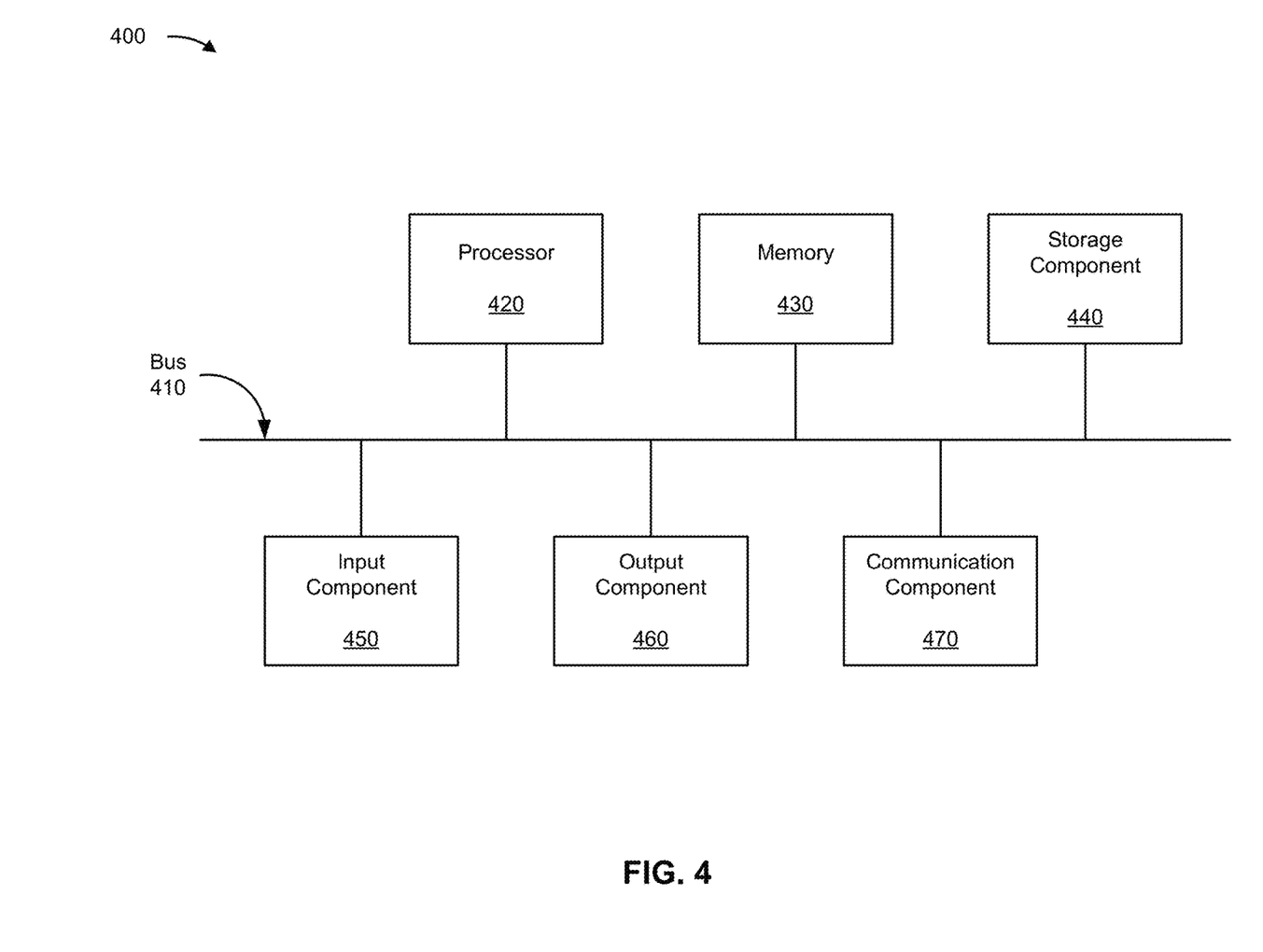
FIG. 4 is a diagram of example components of one or more devices of FIG. 2.

FIG. 4 is a diagram of example components of a device 400, which may correspond to authentication system 301, primary device 330, and/or secondary device 340. In some implementations, authentication system 301, primary device 330, and/or secondary device 340 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
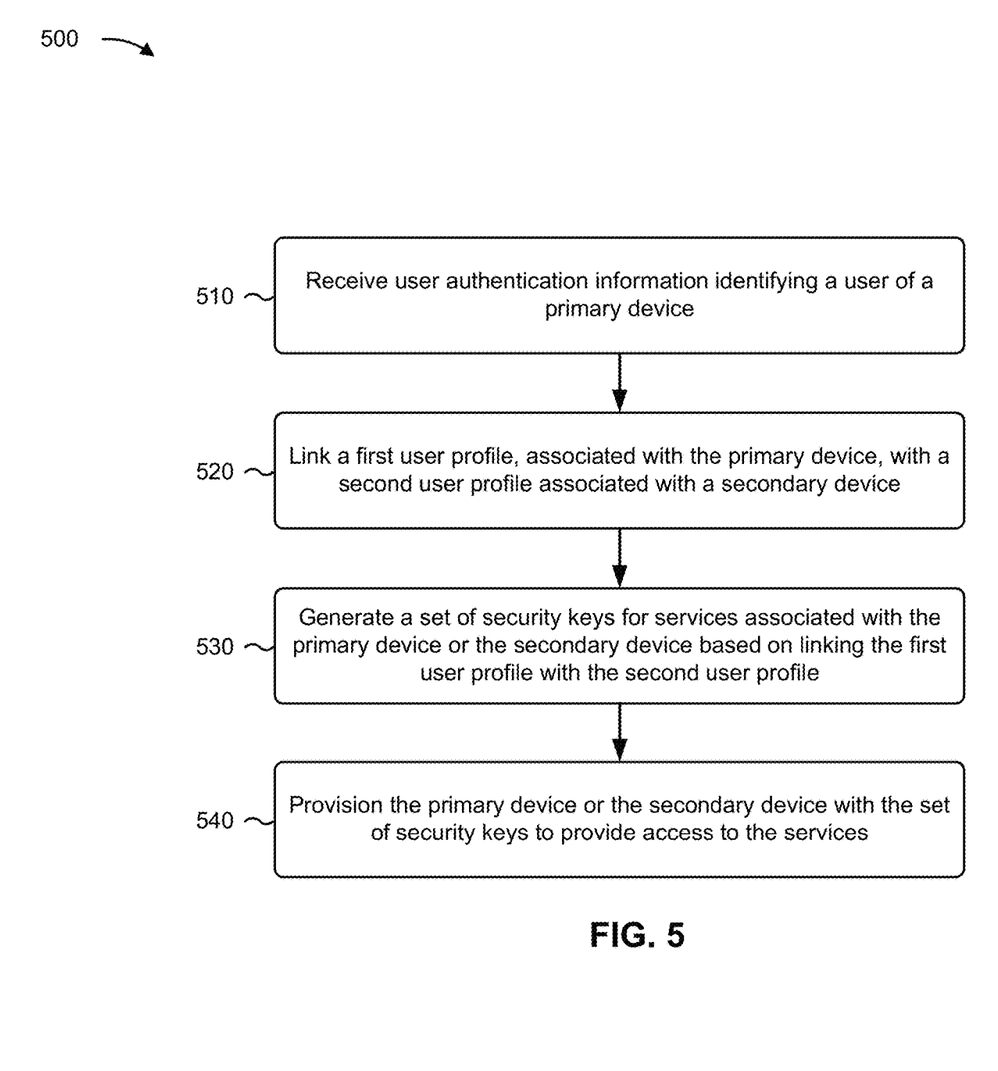
FIG. 5 is a flowchart of an example process relating to network-based authentication for connected vehicle access.

FIG. 5 is a flowchart of an example process 500 associated with systems and methods for network-based authentication for connected vehicle access. In some implementations, one or more process blocks of FIG. 5 may be performed by an authentication system (e.g., authentication system 301). In some implementations, one or more process blocks of FIG. 5 may be performed by another device or a group of devices separate from or including the authentication system, such as a primary device (e.g., primary device 330), a secondary device (e.g., secondary device 340), and/or a device cloud described herein. Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving user authentication information identifying a user of a primary device (block 510). For example, the authentication system may receive a user authentication request identifying a primary device, may generate a challenge associated with a user profile mapped to the primary device, may transmit a challenge message including the challenge, and may receive a challenge response including a response to the challenge, as described above. In some implementations, the response to the challenge includes identification information regarding a first user profile.

As further shown in FIG. 5, process 500 may include linking a first user profile, associated with the primary device, with a second user profile associated with a secondary device (block 520). For example, the authentication system may identify a secondary device associated with the same user as the primary device and may link profiles associated with the primary device and the secondary device, as described above. In some implementations, the authentication system may identify services associated with the primary device and/or the secondary device to share when linking user profiles. Linking the user profile with the other user profile may include synchronizing biometric identification information of the user profile mapped to the primary device with the other user profile mapped to the secondary device, wherein the biometric identification information enables biometric identification of a user of the primary device.

As further shown in FIG. 5, process 500 may include generating a set of security keys for services associated with the primary device or the secondary device based on linking the first user profile with the second user profile (block 530). For example, the authentication system may generate a set of security keys mapped to the set of primary services and the set of secondary services, as described above. Generating the set of security keys may include generating authentication information for one or more services of the set of primary services or the set of secondary services to enable access to the one or more services using the set of security keys. The authentication system may configure access to the first user profile or the second user profile when generating the set of security keys. For example, the authentication system may enable a primary device to access information of the second user profile using an security key or a secondary device to access information of the primary user profile using an security key.

As further shown in FIG. 5, process 500 may include provisioning the primary device or the secondary device with the set of security keys to provide access to the services (block 540). For example, the authentication system may provision the primary device and a secondary device with the set of security keys, and the set of security keys may enable access by the primary device to the set of secondary services and enable access by the set of secondary devices to the set of primary services, as described above. Provisioning the primary device and the secondary device may include transmit, to the secondary device, a push message including an security key, of the set of security keys, and a service link. The authentication system may receive, as a response to transmitting the push message, configuration information associated with a secondary service, and may configure the secondary service for use by the primary device.

In some implementations, process 500 includes receiving a request for biometric identification of a user of a secondary device (e.g., the same user as of the primary device), accessing the first user profile based on a linkage of the second user profile with the first user profile, and authenticating the user for use of the secondary device based on biometric identification information associated with the first user profile. In some implementations, process 500 includes providing, to the primary device, a user interface identifying the set of secondary services, receiving, from the primary device, a request to access a function of a secondary service of the set of secondary services, wherein the request includes an security key of the set of security keys, and communicating with a secondary device to authorize use of the secondary service.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by an authentication system, a user authentication request identifying a primary device;
   generating, by the authentication system, a challenge associated with a user profile associated with the primary device;
   transmitting, by the authentication system, a challenge message;
   receiving, by the authentication system and based on transmitting the challenge message, a challenge response which includes identification information regarding the user profile;
   determining, by the authentication system and based on the identification information, a set of primary services associated with the user profile mapped to the primary device and a set of secondary services associated with a set of secondary devices;
   generating, by the authentication system, a set of security keys mapped to the set of primary services and the set of secondary services; and
   provisioning, by the authentication system, the primary device and the set of secondary devices with the set of security keys, wherein the set of security keys enable access by the primary device to the set of secondary services and enable access by the set of secondary devices to the set of primary services.

2. The method of claim 1, further comprising:
   linking, by the authentication system, the user profile associated with the primary device with another user profile associated with a secondary device, of the set of secondary devices; and
   wherein generating the set of security keys comprises:
   generating, by the authentication system, the set of security keys based on linking the user profile with the other user profile.

3. The method of claim 2, wherein linking the user profile with the other user profile comprises:
   synchronizing, by the authentication system, biometric identification information of the user profile mapped to the primary device with the other user profile mapped to the secondary device, wherein the biometric identification information enables biometric identification of a user of the primary device.

4. The method of claim 2, further comprising:
   receiving, by the authentication system, a request for biometric identification of a user of the secondary device;
   accessing, by the authentication system, the user profile mapped to the primary device based on a linkage of the other user profile mapped to the secondary device with the user profile mapped to the primary device; and authenticating, by the authentication system, the user for use of the secondary device based on biometric identification information associated with the user profile mapped to the primary device.

5. The method of claim 1, wherein provisioning the primary device and the set of secondary devices comprises:
transmitting, by the authentication system and to a secondary device, a push message including an security key, of the set of security keys, and a service link.

6. The method of claim 5, further comprising:
receiving, by the authentication system and as a response to transmitting the push message, configuration information associated with a secondary service of the set of secondary services; and
configuring, by the authentication system, the secondary service for use by the primary device.

7. The method of claim 1, wherein generating the set of security keys comprises:
generating, by the authentication system, authentication information for one or more services of the set of primary services or the set of secondary services to enable access to the one or more services using the set of security keys.

8. The method of claim 1, further comprising:
providing, by the authentication system and to the primary device, a user interface identifying the set of secondary services;
receiving, by the authentication system and from the primary device, a request to access a function of a secondary service of the set of secondary services, wherein the request includes an security key of the set of security keys; and
communicating, by the authentication system, with a secondary device to authorize use of the secondary service.

9. A device, comprising:
one or more processors configured to:
receive user authentication information identifying a user of a primary device and a set of secondary devices for which to authenticate access for the user;
identify a first user profile mapped to the primary device based on the user authentication information;
link the first user profile with a second user profile associated with the set of secondary devices based on the user authentication information;
determine a set of primary services associated with the first user profile and a set of secondary services associated with the second user profile based on linking the first user profile and the second user profile;
generate a set of security keys mapped to at least one service of the set of primary services or at least one service of the set of secondary services; and
transmit information identifying the set of security keys to the primary device or the set of secondary devices, wherein an security key, of the set of security keys, enables access by the primary device to a secondary service of the set of secondary services or enables access by a secondary device, of the set of secondary devices, to a primary service of the set of primary services.

10. The device of claim 9, wherein the one or more processors, to generate the set of security keys, are configured to:
configure access to the first user profile or the second user profile.

11. The device of claim 9, wherein the security key enables direct access to a secondary service of the secondary device by the primary device without a communication occurring between the primary device and the device or a third party device.

12. The device of claim 11, wherein the direct access is via at least one of a Bluetooth beacon transmission or a Near Field Communication transmission.

13. The device of claim 9, wherein the one or more processors are further configured to:
provision an embedded subscriber identity module (eSIM) of the primary device or of at least one of the set of secondary devices based on generating the security key.

14. The device of claim 9, wherein the set of secondary devices includes at least one of an in-vehicle device, a telematics device, or a wearable device.

15. A non-transitory computer-readable medium storing a set of instructions, the set of instructions comprising:
one or more instructions that, when executed by one or more processors of an authentication system, cause the authentication system to:
receive a user authentication request identifying a primary device;
generate a challenge associated with a first user profile mapped to the primary device;
transmit a challenge message including the challenge;
receive, based on transmitting the challenge message, a challenge response including a response to the challenge, wherein the response to the challenge includes identification information regarding the first user profile;
link the first user profile with a second user profile mapped to a secondary device using the identification information; and
determine, based on linking the first user profile with the second user profile, at least one primary service associated with the first user profile or at least one secondary service associated with the second user profile;
generate a set of security keys mapped to the at least one primary service and the at least one secondary service; and
provision the primary device with a first security key of the set of security keys and the secondary device with a second security key of the set of security keys, wherein the first security key enables access to the at least one secondary service and the second security key enables access to the at least one primary service.

16. The non-transitory computer-readable medium of claim 15, wherein the one or more instructions, that cause the authentication system to link the first user profile with the second user profile, cause the authentication system to:
synchronize biometric identification information of the first user profile with the second user profile to enable the secondary device to perform biometric identification of a user of the primary device and associated with the first user profile.

17. The non-transitory computer-readable medium of claim 15, wherein the one or more instructions further cause the authentication system to:
receive a request for biometric identification of a user of the secondary device;
access the first user profile based on a linkage of the first user profile with the second user profile; and authenticate the user for use of the secondary device based on biometric identification information associated with the first user profile.

18. The non-transitory computer-readable medium of claim 15, wherein the one or more instructions, that cause the authentication system to generate the set of security keys, cause the authentication system to:
generate authentication information for the at least one primary service or the at least one secondary service to enable access to one or more services using the set of security keys.

19. The non-transitory computer-readable medium of claim 15, wherein the one or more instructions further cause the authentication system to:
provide, to the primary device, a user interface identifying the at least one secondary service;
receive, from the primary device, a request to access a function of the at least one secondary service, wherein the request includes the first security key; and
communicate with the secondary device to authorize use of the at least one secondary service.

20. The non-transitory computer-readable medium of claim 15, wherein the authentication system includes at least one of a telematics control unit function, a trusted service manager function, or an identity management function.

* * * * *